(12) United States Patent
Shyu et al.

(10) Patent No.: US 7,477,462 B2
(45) Date of Patent: Jan. 13, 2009

(54) AUTO-FOCUS LENS MODULE

(75) Inventors: San-Woei Shyu, Taipei (TW);
Shih-Chao Huang, Taipei (TW);
Hsien-Ru Chu, Taipei (TW)

(73) Assignee: E-Pin International Tech Co., Ltd., Taipei (TW)

( * ) Notice: Subject to any disclaimer, the term of this patent is extended or adjusted under 35 U.S.C. 154(b) by 117 days.

(21) Appl. No.: 11/484,674

(22) Filed: Jul. 12, 2006

(65) Prior Publication Data
US 2008/0013196 A1     Jan. 17, 2008

(51) Int. Cl.
*G02B 7/02* (2006.01)

(52) U.S. Cl. ................................ 359/824; 359/822
(58) Field of Classification Search ......... 359/811–824, 359/642, 676, 694
See application file for complete search history.

(56) References Cited

U.S. PATENT DOCUMENTS 7,268,959 B2 * 9/2007 Shyu et al. .................. 359/819

2006/0028929 A1 * 2/2006 Osaka ..................... 369/44.14
2006/0176589 A1 * 8/2006 Shu et al. .................. 359/824
2006/0214520 A1 * 9/2006 Tseng ........................ 310/14

* cited by examiner

*Primary Examiner*—Jessica T Stultz
*Assistant Examiner*—Mahidere S Sahle
(74) *Attorney, Agent, or Firm*—Troxell Law Office, PLLC

(57) ABSTRACT

An auto-focus lens module that uses electromagnetic force as well as spring force as driving force to control movement of the lens for auto-focusing consists of a rectangular base, two copper plates, an insulation spacer, four magnets, a lens holder, a lens, a coil, a spring, and a rectangular top cover. The lens holder, the lens and the coil form a lens set. The spring is sleeved outside the coil and is elastically supporting between the outer circular flange and the top cover while the four magnets are respectively located outside the spring, on four corners of the rectangular case. Thus the components of the lens module according to the present invention are simplified, the volume of the device is minimized, and the lens holder moves stably for focusing.

6 Claims, 7 Drawing Sheets

AUTO-FOCUS LENS MODULE

BACKGROUND OF THE INVENTION

The present invention relates to an auto-focus lens module, especially to a lens module that uses electromagnetic force as well as spring force as driving force to control movement of the lens for auto-focusing.

Either digital cameras or mobile phones with shooting function are disposed with a lens module that includes stepless type or two-step auto focusing type. The lens module available now has features of light weight, compact size, precision and durability. However, structure of conventional lens module is still quite complicated with quite large volume, against the principle of compact design. Moreover, spring blades are used to balance the electromagnetic force while the spring blades are easy to be deformed by external forces such as vibration, rebounding or after being used for a long time so that the stability and accuracy of the movement of the lens holder have been affected. Therefore, there is still a space for improvement.

SUMMARY OF THE INVENTION

It is therefore a primary object of the present invention to provide an auto-focus lens module that includes a lens holder, a lens and a coil to form a lens set. Moreover, a spring elastically supports between an outer circular flange of the lens holder and a top cover while four magnets are respectively disposed outside the spring, on four corners of a rectangular base. Thus, structure of the lens module is simplified and the volume of the lens module is minimized with effect of stable movement for focusing.

DETAILED DESCRIPTION OF THE PREFERRED EMBODIMENT

Figure 1:
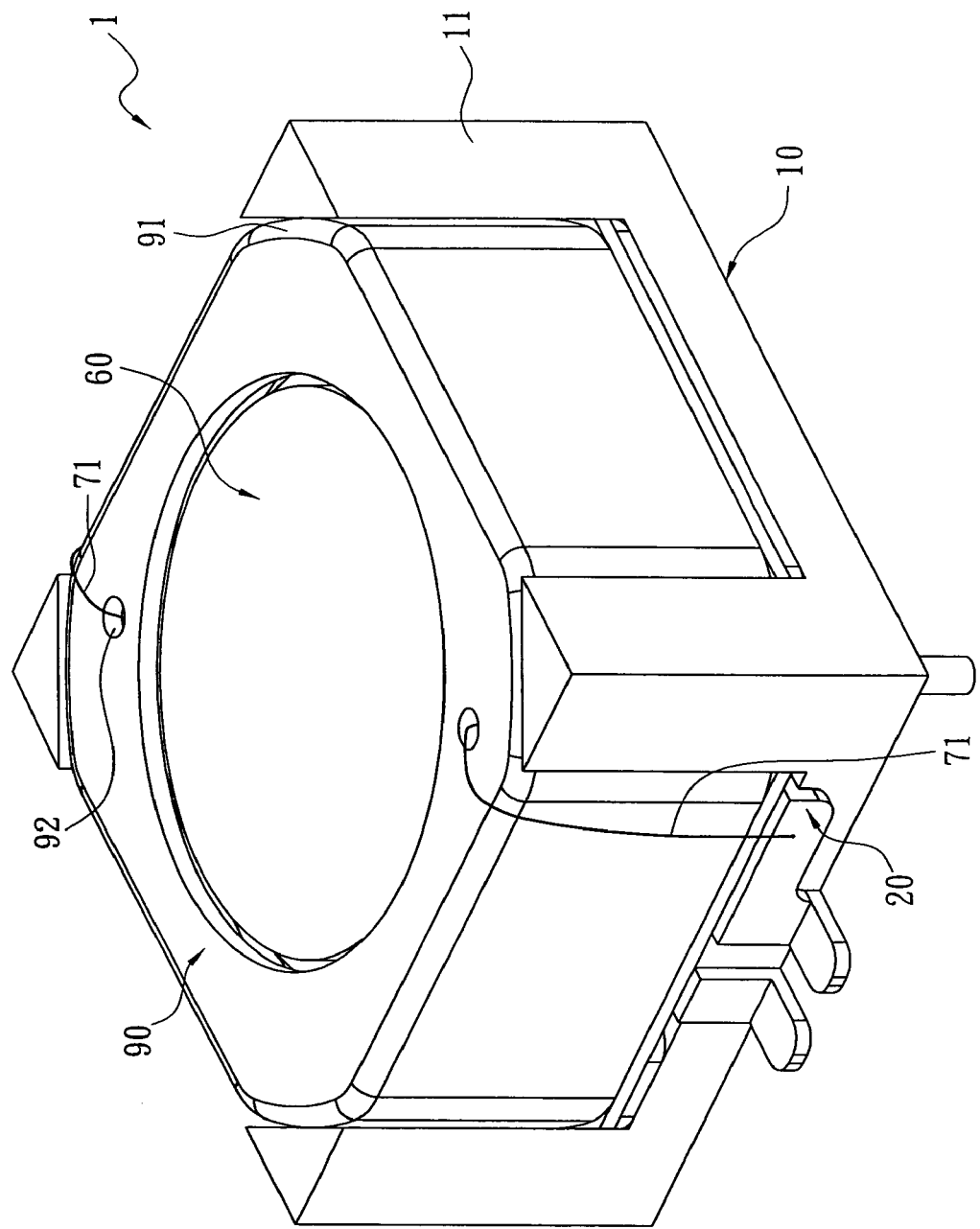
FIG. 1 is a perspective view of an embodiment according to the present invention.
Figure 2:
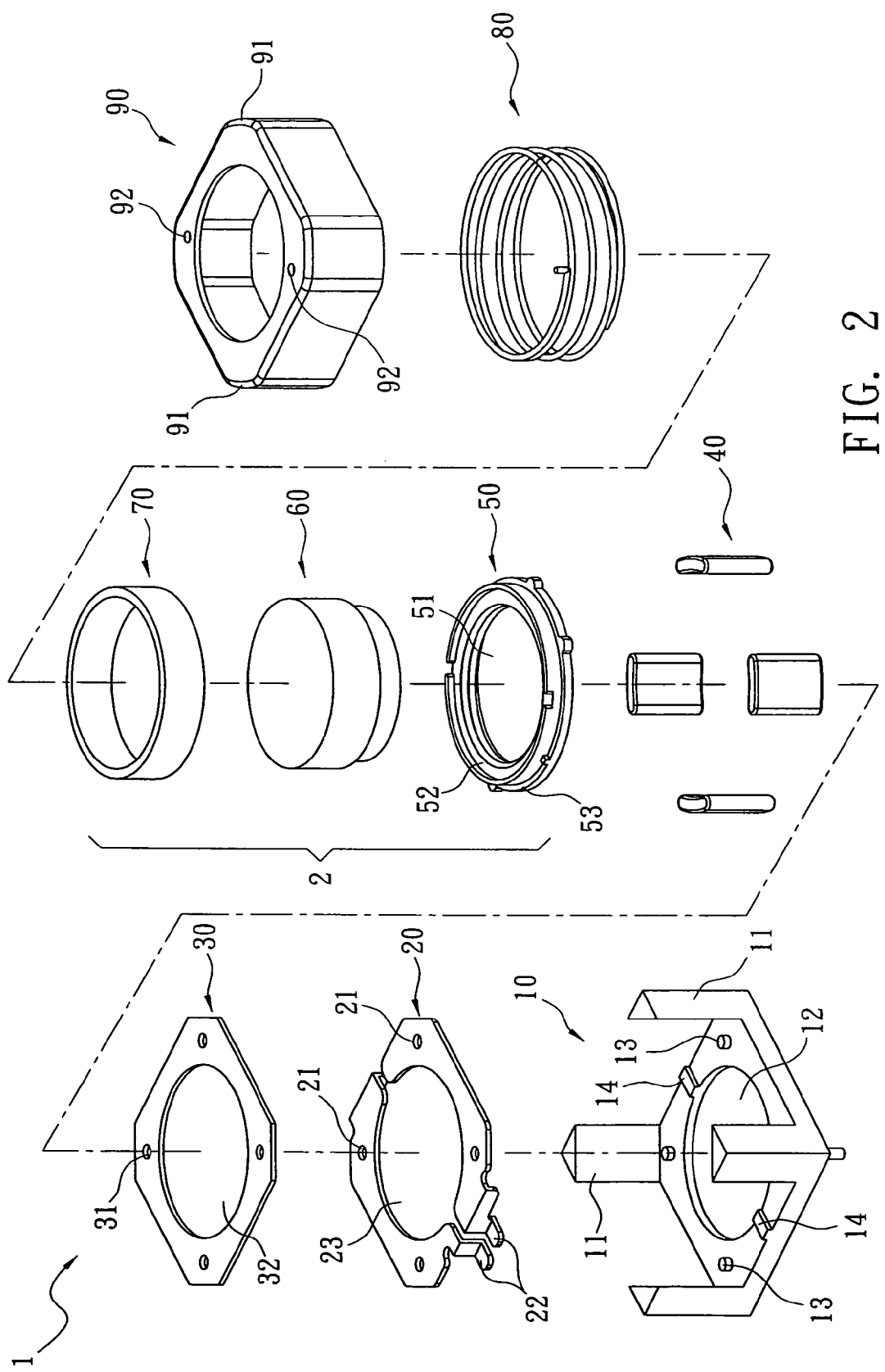
FIG. 2 is an explosive view of the embodiment in FIG. 1 according to the present invention.

Refer from FIG. 1 to FIG. 4, a lens module 1 according to the present invention includes a rectangular base 10, two conductive plates 20 such as copper plates, an insulation spacer 30, four magnets 40, a lens holder 50, a lens 60, a coil 70, a spring 80, and a rectangular top cover 90. As shown in FIG. 2, a lens set 2 composed by the lens holder 50, the lens 60 and the coil 70 moves upwards and downwards between the base 10 and the top cover 90 for focusing.

Figure 3:
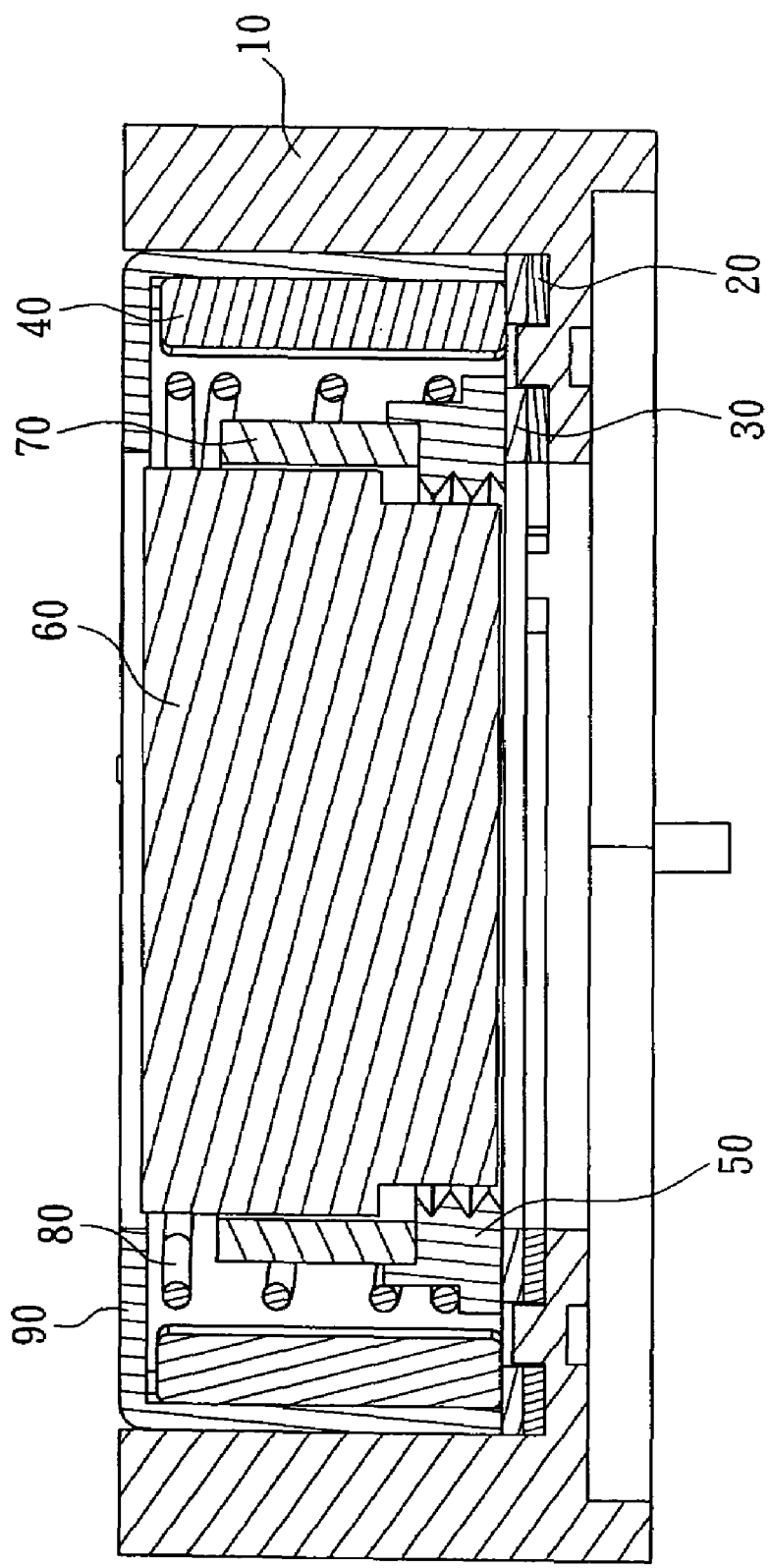
FIG. 3 is a lateral cross-sectional view of the embodiment in FIG. 1 according to the present invention.
Figure 4A:
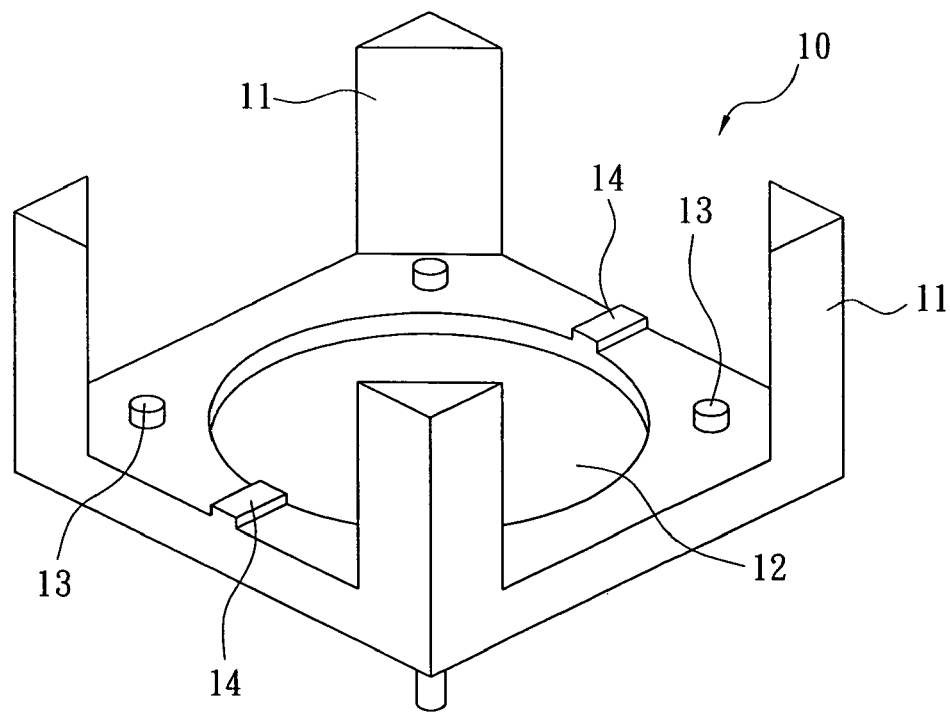
FIG. 4A-4H are schematic drawings showing assembling of each component according to the present invention.
Figure 4B:
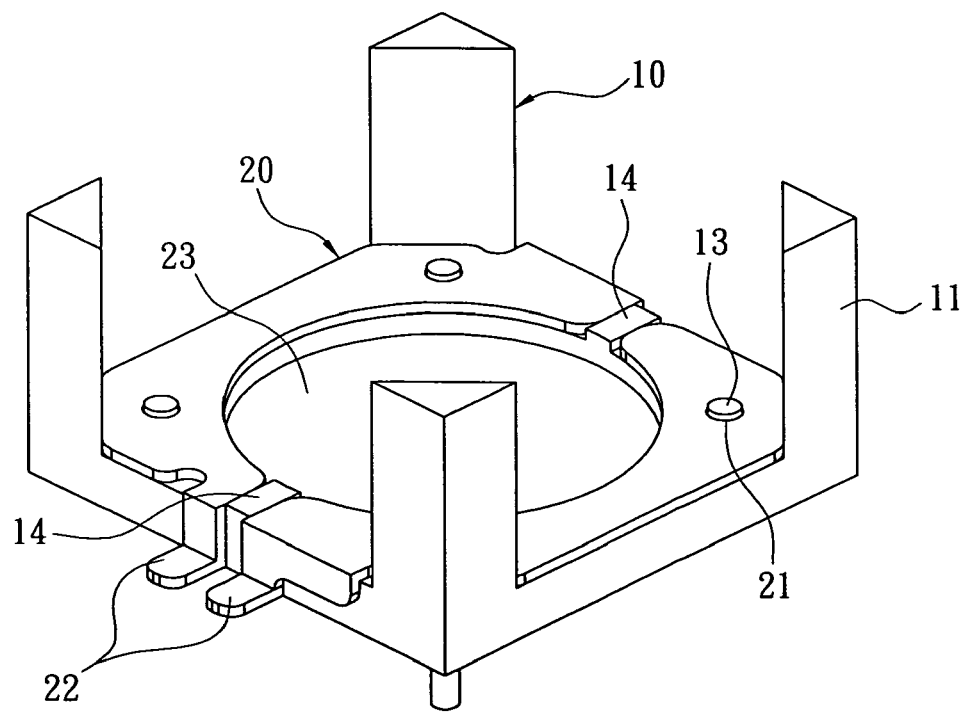
Figure 4C:
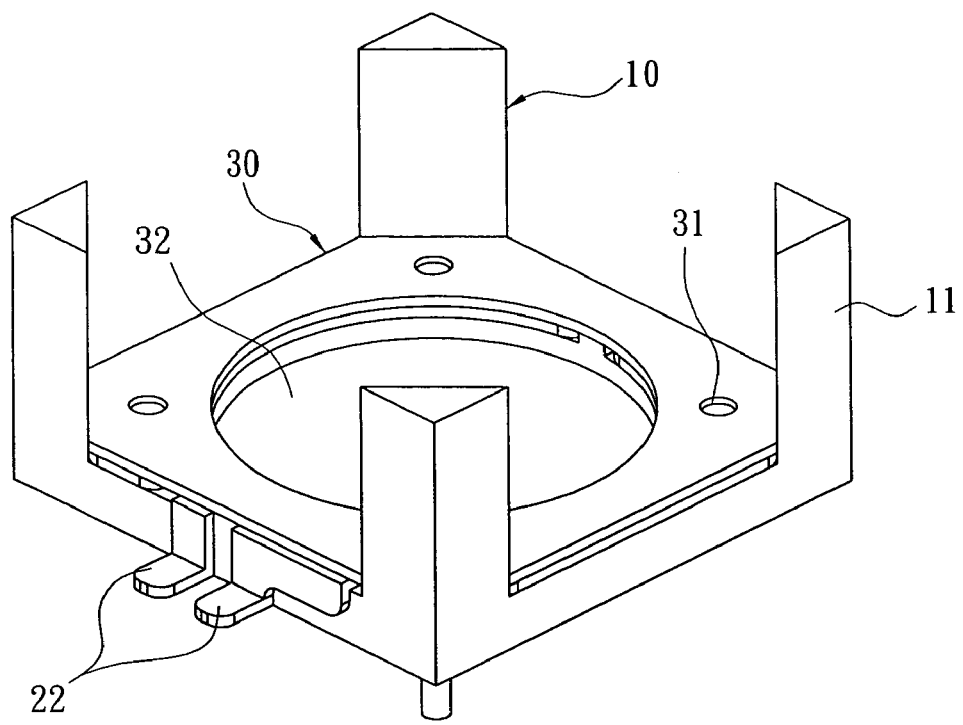
Figure 4D:
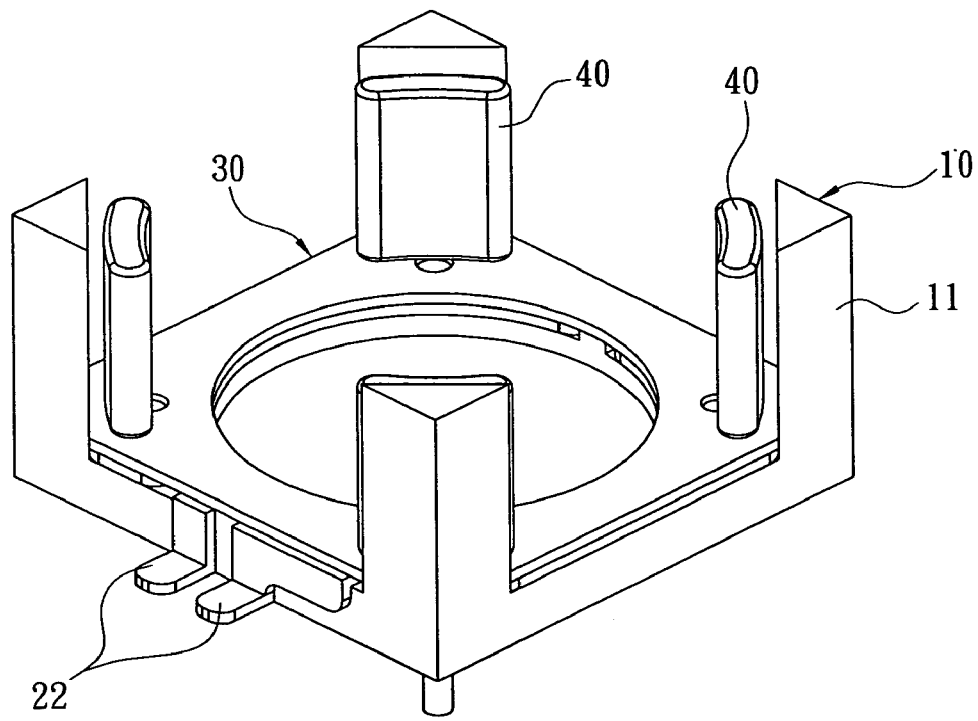
Figure 4E:
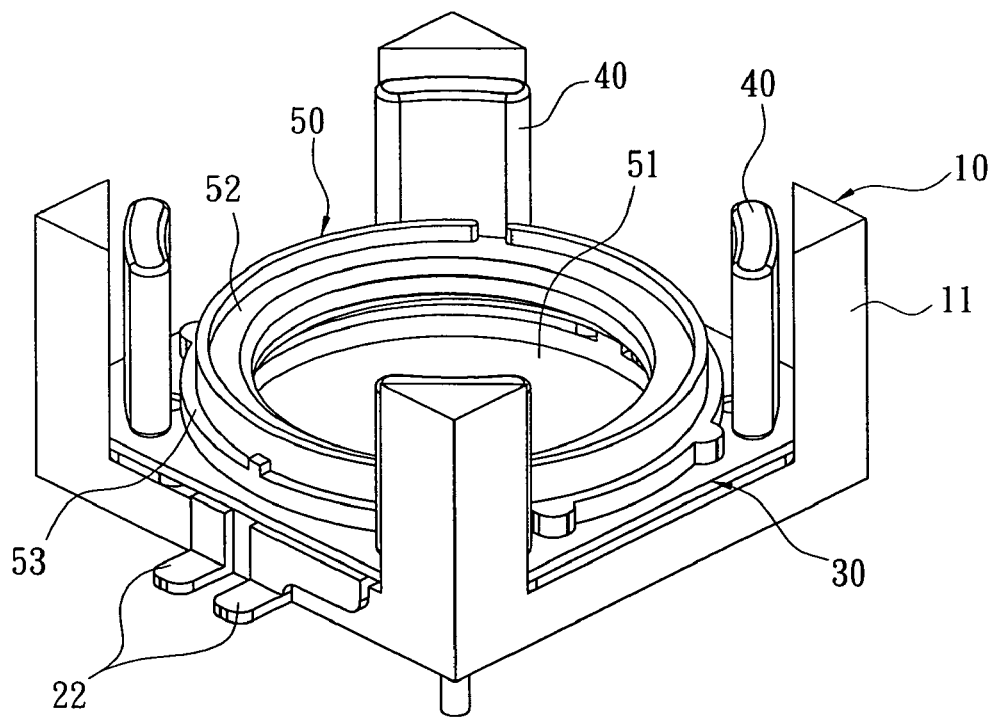
Figure 4F:
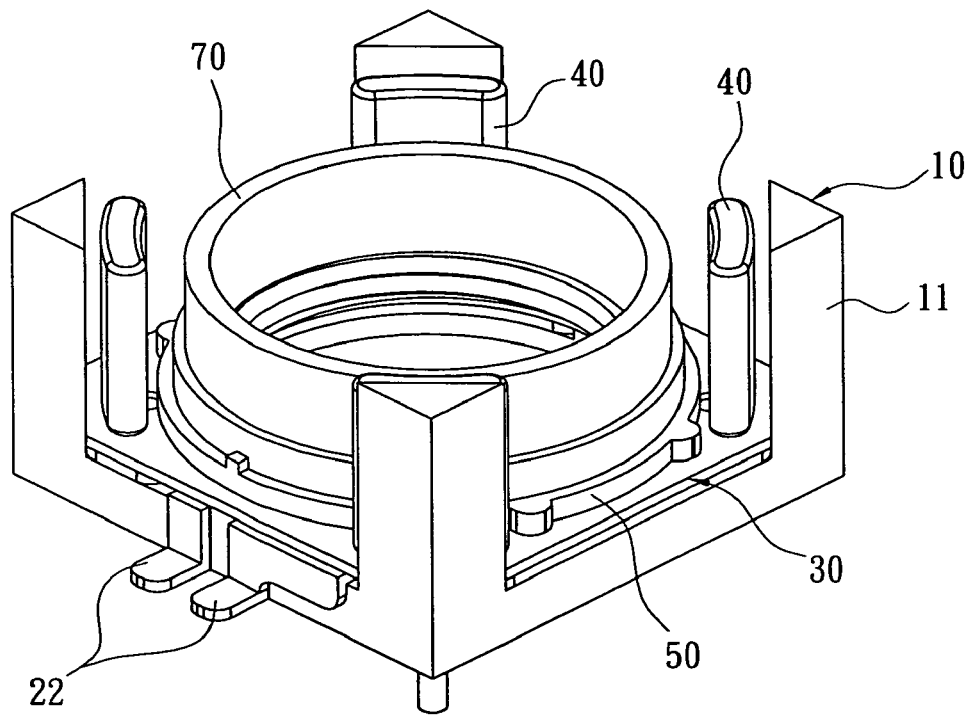
Figure 4G:
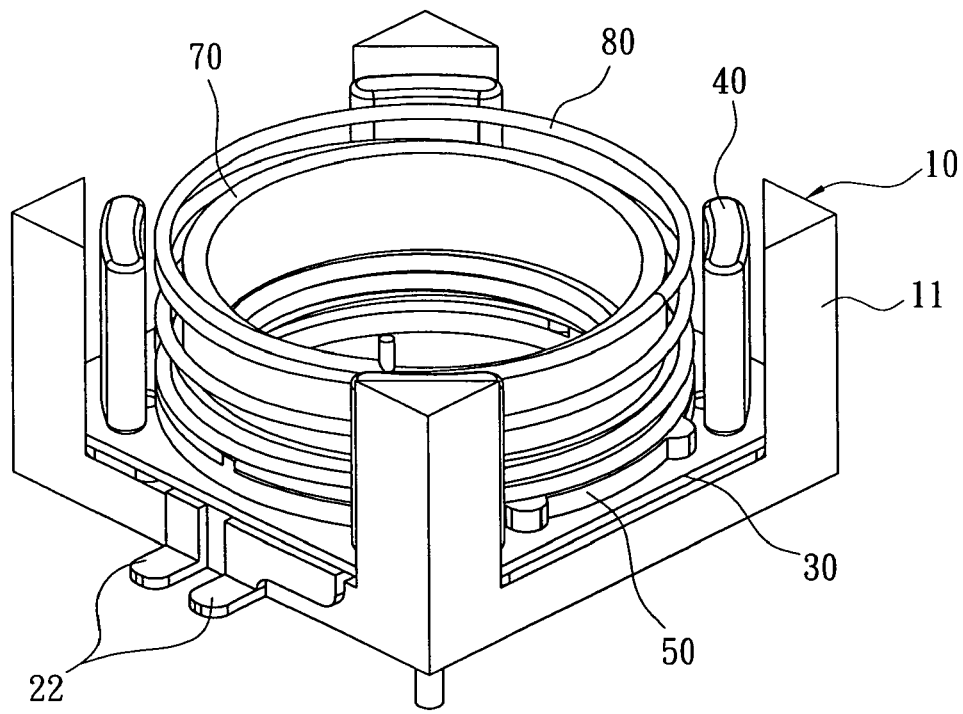
Figure 4H:
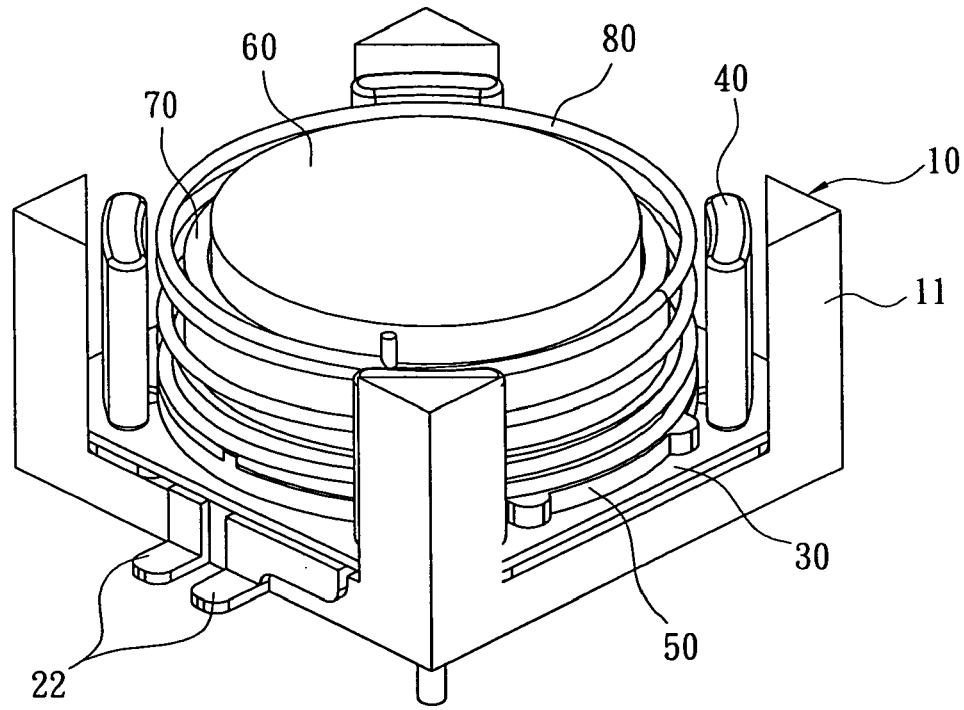

Refer to FIG. 4A, the base 10 is a rectangular frame with four stands 11 on four corners for assembling with the top cover 90. A central hole 12 on center of the base 10 is used to form an opening in optical pathway of the lens 60. A plurality of positioning pins 13 and projections 14 for isolation are arranged on inner surface of the base 10. Refer to FIG. 4B, by the combination of the positioning hole 21 and the positioning pins 13, the two conductive plates 30 are disposed on the base 10 in insulated status and respectively connect to different electrodes by projecting pieces 22. Moreover, a central hole 23 corresponding to the central hole 12 of the base 10 is formed between the two conductive plates 20. Refer to FIG. 4C, the isolation spacer 30 attaches on the two conductive plates 20 by positioning holes 31 and positioning pins 13 thereof. The isolation spacer 30 having a central hole 32, corresponding to the central holes 12, 23. As shown in FIG. 4D, the four magnets 40 are symmetrical arched magnets, respectively arranged on inner side of the four stands 11 of the base 10, being positioned by inner surface of the top cover 90. The four magnets 40 can also be respectively arranged and fixed on four corners of inner surface of the top cover 90 for easy assembling. There is no limitation on assembling sequence of the components. Refer from FIG. 4E to FIG. 4H, the lens holder 50 is a torus with having a central hole, an inner circular flange and an outer circular flange while the lens 60 is fixed on the central hole 51 of the lens holder 50 by threads, as shown in FIG. 3. the coil is enclosed outside the lens and is fixed on the inner circular flange of the lens holder. By adhesion of the coil 70 with the lens holder 50, the lens holder 50, the lens 60, and the coil 70 form a lens set 2 that moves synchronously, as shown in FIG. 2. Moreover, the lens set 2 is arranged over the insulation spacer 30 so as to make the lens 60 on the same axis with respective central holes 12, 23, 32. The spring 80 is arranged outside the coil 70 and is stopped on the outer circular flange 53 of the lens holder 50 for elastically supporting between the outer circular flange 53 and inner surface of the top cover 90. Refer to FIG. 1, the top cover 90 is a housing designed for assembling with the base 10, having truncated ends 91 on four corners thereof so as to make the top cover 90 mount between the four stands 11 of the base 10 and fasten with the base 10 to form the lens module 1. The four magnets 40 are also clipped and fixed between inner surface of the top cover 90 and the insulation spacer 30. Furthermore, there are two symmetrical insertion holes 92 on the top cover 90 so that head/tail wires 71 of the coil 70 inside the top cover 90 respectively insert through each insertion hole 92, over outer surface of the top cover 90, being welded on two conductive plates 20 with different electrodes. Thus during auto-focusing process of the lends set 2, the coil 70 and the conductive plates 20 are still electrically connected, and also the wires 71 will not easily break due to long term movement of the lens set 2.

While being assembled, the spring 80 can be compression springs. When the top cover 90 fastens with the base 10, the spring 80 is in compressed status, pressing the lens holder 50 downwards so as to make the lens holder set 2 stop on "dead point" during the zoom-in/zoom-out process, this is the far focus position. By changing electrodes and current on head and tail of the coil 70, in combination with the N and S poles of the magnets 40, electromagnetic force with different magnitude and in different direction (upward/downward) is generated so as to drive the lens holder set 2 moving between the inner surface of the top cover 90 and the insulation spacer 30 for focusing. In this embodiment, the electromagnetic force between the coil 70 and the magnets 40 is generated forwardly. While the lens holder set 2 is at far focus, there is no current passing through the coil 70 so that no electromagnetic force is generated and thus the lens holder set 2 stays. While focusing, certain amount of current passes through the coil 70 so as to generate electromagnetic force that drives the lens holder set 2 to move upwards and stop at close focus. When the electromagnetic force equals to the compression force of the spring 80 acted on the lens holder set 2, the lens holder set 2 stops at the adjusted position. Therefore, the lens holder set 2 moves from the far focus to the close focus upwards by the electromagnetic force while turns back from the close focus to the far focus downwards by restoring force of the compressed spring 80. By means of wire design, the lens set 2 has stepless type or two step type (far focus/close focus) auto-focusing.

Compare with conventional lens module, the components of the present invention are fewer. Only the spring 80 is sleeved on circular flange 53 of the lens holder 50 and the four magnets 40 are respectively located on inner side of four stands of the rectangular case 10. Therefore, the structure of the lens module is simplified, and the volume of the lens module 1 is more efficiently reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lens module comprising a rectangular base, two conductive plates, an insulation spacer, four magnets, a lens holder, a lens, a coil, a compression spring, and a rectangular top cover, wherein the base that is a rectangular frame with four stands on four corners for fastening with the top cover while an insertion hole is on center thereof to form an opening in optical pathway of lens;

a plurality of positioning pins are disposed on inner surface thereof;

the conductive plates are secured on the base by assembling of positioning holes and the positioning pins in insulated status and a central hole corresponding to the central hole of the base is formed between the two conductive plates;

the magnets are symmetrical arched magnets, respectively arranged on inner side of the four stands of the base;

the lens holder is a torus having a central hole, an inner circular flange and an outer circular flange;

the lens is mounted and fixed on the central hole of the lens holder; the coil is enclosed outside the lens and is fixed on the inner circular flange of the lens holder and a head wire and a tail wire of the coil are respectively connected to different electrodes of the two conductive pieces;

the spring is sleeved outside the coil, on the outer circular flange of the lens holder for elastically supporting between the outer circular flange and the top cover the top cover is disposed over and fastened with the base; thereby, the lens holder, the lens and the coil form a lens set that moves synchronously and the electromagnetic force generated by interaction between the coil and the magnets is used to drive the lens set to move while the lens set moves stably by a restoring force of the spring for focus adjustment.

2. The auto-focus lens module as claimed in claim 1, wherein the lens is fixed on the central hole of the lens holder by threads.

3. The auto-focus lens module as claimed in claim 1, wherein the coil is fixed on the inner circular flange of the lens holder by adhesion.

4. The auto-focus lens module as claimed in claim 1, wherein a truncated end is arranged on each of four corners of the top cover so as to make the top cover assemble and fix among the four stands of the base.

5. The auto-focus lens module as claimed in claim 1, wherein two symmetrical insertion holes are disposed on the top cover so that the head wire and the tail wire of the coil inserts through the insertion holes respectively, over outer surface of the top cover, being welded on the conductive plate.

6. The auto-focus lens module as claimed in claim 1, wherein movement of the lens set for focusing includes stepless type or far focus/close focus two-step type auto-focusing.

\* \* \* \* \*